US006962491B2

(12) United States Patent
Nishizawa et al.

(10) Patent No.: US 6,962,491 B2
(45) Date of Patent: Nov. 8, 2005

(54) INJECTION MOLDING MACHINE USING A LINEAR MOTOR

(75) Inventors: Makoto Nishizawa, Numazu (JP); Katsuhito Ogura, Numazu (JP); Katsuyoshi Kido, Numazu (JP); Harumichi Tokuyama, Odawara (JP); Hiroyuki Onuma, Mishima (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 102 days.

(21) Appl. No.: 10/385,469

(22) Filed: Mar. 12, 2003

(65) Prior Publication Data

US 2003/0211190 A1  Nov. 13, 2003

(30) Foreign Application Priority Data

Mar. 12, 2002 (JP) .............................. 2002-066515
Feb. 18, 2003 (JP) .............................. 2003-040006

(51) Int. Cl.⁷ ............................................ B29C 45/78
(52) U.S. Cl. ...................... 425/143; 425/144; 425/145; 264/40.6
(58) Field of Search ................................ 425/143, 144, 425/145; 264/40.1, 40.3, 40.6; 310/54, 80; 355/55

(56) References Cited

U.S. PATENT DOCUMENTS

| 5,620,646 A | * | 4/1997 | Sparer et al. ................. 310/54 |
| 5,689,994 A | * | 11/1997 | Nagai et al. .................. 310/80 |
| 6,682,669 B2 | * | 1/2004 | Bulgrin et al. ............. 425/145 |
| 6,769,892 B1 | * | 8/2004 | Hehl ........................... 425/145 |
| 6,810,298 B2 | * | 10/2004 | Emoto ......................... 700/121 |
| 6,813,002 B2 | * | 11/2004 | Ota ............................... 355/55 |

* cited by examiner

*Primary Examiner*—Tim Heitbrink
(74) *Attorney, Agent, or Firm*—Pillsbury Winthrop Shaw Pittman LLP

(57) ABSTRACT

An injection molding machine using a linear motor, has a linear motor serving as a linear drive mechanism; a temperature sensor configured to detect a temperature of a coil of said linear motor or an ambient temperature thereof; an input unit configured to input a signal of the temperature detected by said temperature sensor; a data converting unit configured to convert the detected temperature signal into temperature data; a storage unit, including a temperature data setting unit configured to preset an allowable temperature, etc., configured to store temperature data converted by said data converting unit; a comparing/calculating unit configured to compare the temperature data converted by said data converting unit with a set value set in said data setting unit and make a calculation thereof; an output unit configured to output an instruction signal and display data, corresponding to a result of the calculation by said comparing/calculating unit; and a display unit configured to display the display data outputted from said comparing/calculating unit.

7 Claims, 2 Drawing Sheets

INJECTION MOLDING MACHINE USING A LINEAR MOTOR

BACKGROUND OF THE INVENTION

The present invention relates to an injection molding machine using a linear motor.

An injection molding machine for molding a product by injecting a molten resin, etc. into a die assembly involves the use of a multiplicity of linear drive mechanisms as for an injection apparatus in which a screw and a plunger are moved in axial direction within a barrel, a clamping apparatus for opening and closing and clamping the die assembly.

This linear drive has hitherto usually employed a mechanism for converting a rotary motion of a motor into a linear motion through a ball screw. The mechanism for converting the rotary motion into the linear motion through the ball screw is, however, complicated, and, a contrivance for omitting this complicated mechanism, as disclosed in Japanese Patent Application Post-Exam Publication No. 5-13805, is that the linear motion unit is driven directly by use of an AC linear motor.

The use of the AC linear motor, however, entails problems arisen as follows:

(a) An axial length of the linear motor is longer than the ball screw, and hence the apparatus increases in size, with the result that an area for installing the apparatus is enlarged and this is followed by a rise in cost.

(b) The linear motor using an iron-cored coil is utilized for obtaining a large thrust, however, a magnetic attraction force that is several times as large as the thrust is generated, so that a highly rigid mechanical structure is needed with an increased weight of this structural body.

(c) An electrical angle origin lead-in operation is difficult due to the strong magnetic attraction force, and a phase error in electrical angle can not be reduced. This electrical angle phase error eventually becomes a factor of disturbance, and therefore a gain can not be raised, resulting in an occurrence of vibrations.

Such being the case, an injection molding machine using a DC linear motor having none these problems came to be employed.

In this injection molding machine using the DC linear motor, however, a new problem arises, wherein an exothermic quantity of the coil becomes large depending on a state of the use.

This heat involved seriously affects characteristics of a measuring device such as a position measuring linear scale installed in the vicinity of the motor, and besides, if the heat emission is intensive, this might cause serious troubles such as a burn down of the coil, and a subsequent fire and so on.

The heat emission might cause the serious troubles described above, and nevertheless there has hitherto existed a device for displaying an exothermic state or giving an alarm against the heat emission before the trouble happens.

SUMMARY OF THE INVENTION

It is an aspect of the present invention to provide an injection molding machine using a DC linear motor, which is capable of eliminating the variety of troubles caused by the heat emission described above arid performing a safety operation by displaying the heat emission or giving an alarm before the trouble happens.

According to one embodiment of the present invention, there is provided an injection molding machine using a linear motor, comprising: a linear motor serving as a linear drive mechanism; a temperature sensor for detecting a temperature of a coil of said linear motor or an ambient temperature thereof and to output a temperature signal; an input unit for inputting the temperature signal output by said temperature sensor; a data converting unit for converting the detected temperature signal into temperature data; a storage unit, including a temperature data setting unit for presetting an allowable range of temperature data, etc., for storing temperature data converted by said data converting unit; a comparing/calculating unit for comparing the temperature data converted by said data converting unit with the allowable range of temperature data set in said data setting unit and making a calculation based on the temperature data; an output unit for outputting an instruction signal and display data, corresponding to results of the comparison and calculation by said comparing/calculating unit; and a display unit for displaying the display data outputted from said comparing/calculating unit.

By employing the present invention, the injection molding machine capable of performing the safety operation can be provided, wherein a possibility of the variety of troubles due to the heat emission is displayed or the alarm is given before the trouble happens.

BRIEF DESCRIPTION OF THE DRAWINGS

Embodiments of the present invention will be explained with reference to the accompanying drawings, wherein.

DETAILED DESCRIPTION OF THE INVENTION

Figure 1:
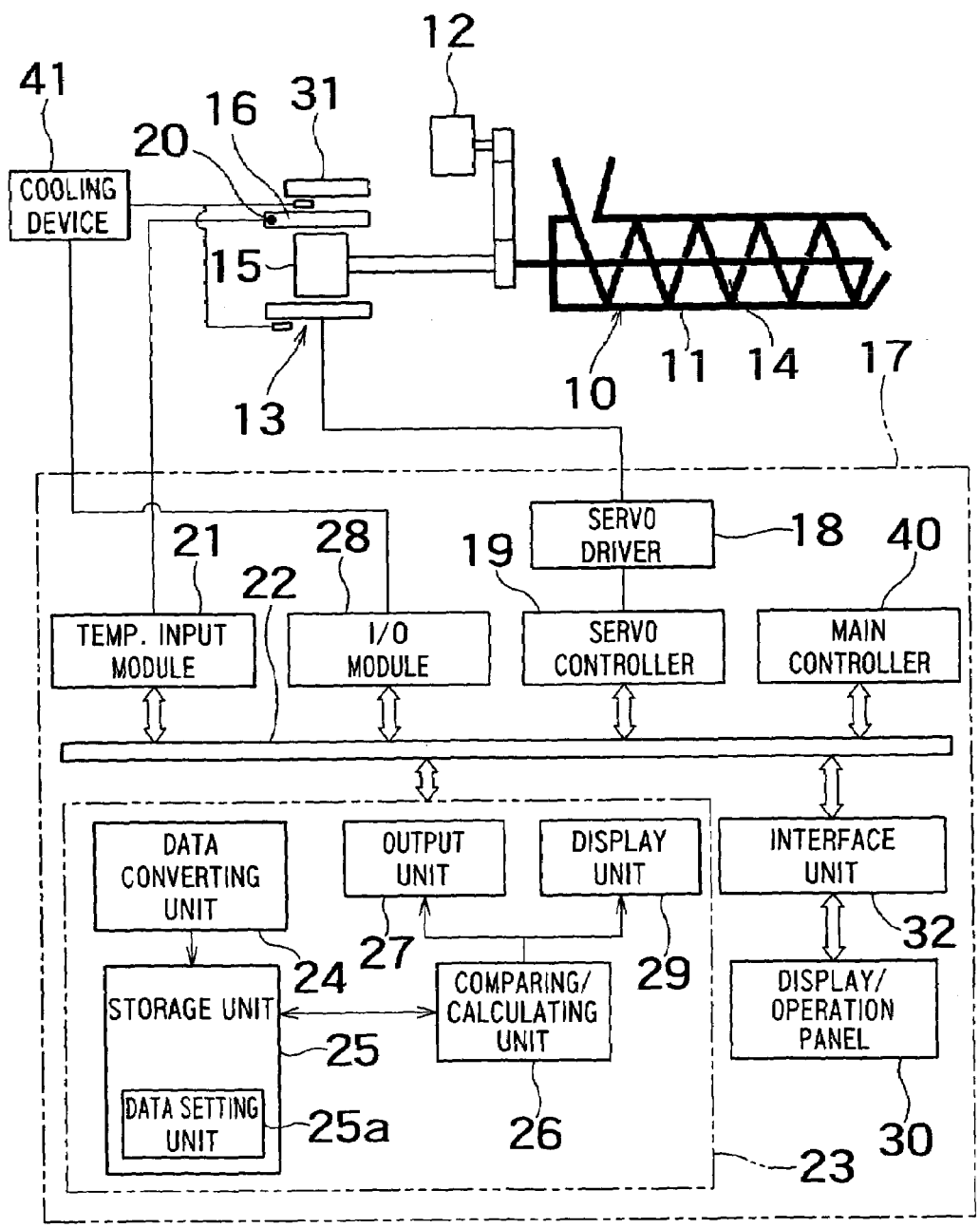
FIG. 1 schematically depicts an injection molding machine according to one embodiment of the present invention.

The discussion will be hereinafter be made with reference to FIG. 1 by exemplifying an injection apparatus by way of one embodiment of an injection molding machine of the present invention.

In an injection apparatus 10, a screw 14 moving back and forth in axial directions is inserted in an interior of a heating barrel 11. This screw 14 is rotated by a measuring motor 12 and linearly driven by a DC linear motor 13. The linear motor 13 includes a magnet 15 and a coil 16 wound on a peripheral surface thereof. This coil 16 is connected via a servo driver 18 to a servo controller 19, provided within an injection molding machine control device 17 depicted around by a 2-dotted chain line, for controlling the injection molding machine 10, whereby its drive is controlled. The coil 16 is attached with a temperature sensor 20 for measuring a temperature. Further, a linear scale 31 for detecting a moving quantity of the screw 14 is fitted in the vicinity of the linear motor 13.

A temperature detected by the temperature sensor 20 is inputted to a temperature input module 21 provided in the injection molding machine control device 17. The detected temperature undergoes an A/D conversion herein and is thereafter captured by a data converting unit 24 in a temperature detection unit 23 drawn around by a chain line through a bus 22. The data converting unit 24 updates the detected temperature as a fixed quantity of data in time-series with a fixed period, and the thus updated data are stored on a storage unit 25. The storage unit 25 is provided inside with a data setting unit 25a. For example, an allowable temperature value (that is a normally operable upper limit value), an allowable maximum temperature value, a cooling necessary temperature value of the linear motor 13, operation allowable temperature values of peripheral devices (such as the linear scale, etc.) and injection molding cycle time changing data, which serve as criterions for calculating a continuous operable time in operation at an injection molding cycle time at an arbitrary point of time, can be set in this data setting unit 25*a*.

A comparing/calculating unit 26 compares data of the detected temperature stored on the storage unit 25 through the data converting unit 24 with the allowable temperature value of the linear motor 13 that is previously stored in the data setting unit 25*a* of the storage unit 25. The comparing/calculating unit 26 also calculates, if operated at the injection molding cycle time thereat at the arbitrary point of time, how much the continuous operation time is left till the allowable temperature value is reached. The display unit 29 displays the calculated time on a display screen of a display operation panel 30 through the bus 22 and a machine interface 32. Further, when the cycle time is decreased based on this calculated time, the comparing/calculating unit 26 can predict what quality the molded product may have. When making such a prediction, an output unit 27 transmits via the bus to a main control unit 40 such cycle time data and cycle time changing signal as to become the injection molding cycle time at which the continuous operation can be done within the allowable temperature value. The main control unit 40 issues a command of changing the cycle time, whereby the linear motor 13 can continuously operate within the allowable temperature value.

The comparing/calculating unit 26 is capable of taking the data in and out of the storage unit 25. The comparing/calculating unit 26 arithmetically compares an alarm temperature T1 lower by, e.g., 20° C. than the allowable maximum temperature of the linear motor 13 that is set in the data setting unit 25*a* of the storage unit 25 with a detected temperature T, thus monitoring whether or not the detected temperature T falls within the alarm temperature T1. If the detected temperature T is higher than the alarm temperature T1, the output unit 27 transmits a signal to an I/O module 28 via the bus 22, whereby the I/O module 28 gives an alarm signal or the display unit 29 displays the alarm on the display operation panel 30 via the bus 22.

The output unit 27 executes not only outputting the alarm signal and displaying the alarm described above but also forced cooling of the linear motor 13 when reaching a cooling necessary temperature, and therefore cools the linear motor 13 by outputting an operation-ON signal to a cooling device 41 via the I/O module 28. As the cooling device, various type of cooling system can be employed. For example, an air cooling system, a water cooling system, or an electric cooling system using Peltier element may be used. The output unit 27, when the temperature becomes equal to or lower than the temperature preset in the data setting unit 25*a*, performs temperature control to stop the cooling operation by outputting an operation-OFF signal. Moreover, in the case of reaching the allowable maximum temperature of the linear motor 13 due to some cause, the servo control unit 19 is operated to stop the operation of the linear motor 13, and so on.

Thus, according to this embodiment, the stable operation of the injection molding machine can be attained by restraining a rise in the heat emission from the linear motor 13.

Figure 2:
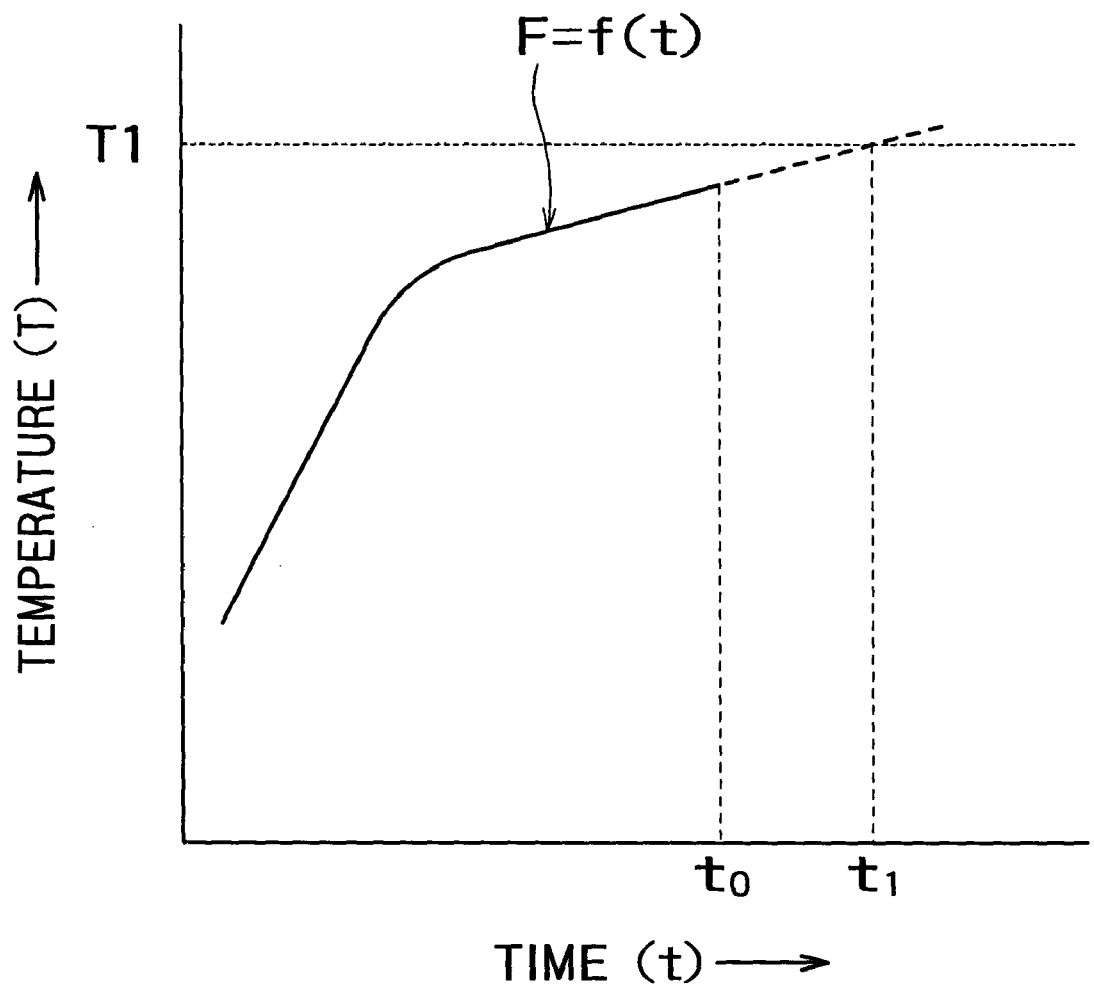
FIG. 2 schematically depicts a relationship between an exothermic temperature and time according to an embodiment of the present invention.

FIG. 2 is a graphic chart showing a relationship between an exothermic temperature and a time. The comparing/calculating unit 26 calculates a function $F=f(t)$ which approximates the detection value. Accordingly, a time $t_1$ when reaching the alarm temperature T1 can be predicted based on this function, and besides it is possible to predict a remaining time $(t_1-t_0)$ for which the continuous operation from the present time $t_0$ up to an alarm time $t_1$ can be performed. These values can also be extracted as data signals.

Further, the comparing/calculating unit 26 arithmetically compares the operation allowable temperature value, preset in the data setting unit 25*a* of the storage unit 25, of the peripheral device such as the linear scale 31, etc. attached in the vicinity of the linear motor 13 with the detected temperature data convened by the data converting unit 24 and stored on the storage unit 25. If the detected temperature data is higher than the operation allowable temperature value of the peripheral device, the output unit 27 sends an operation cautious alarm of the peripheral device on the display screen of the display operation panel 30 through the bus 22. On this occasion, the output unit 27 simultaneously outputs the operation-ON signal to the cooling device 41 via the I/O module 28 in order to perform the forced cooling of the linear motor 13 described above, and, when lower than the peripheral device operation temperature preset in the data setting unit 25*a*, the output unit 29 outputs the operation-OFF signal to stop the forced cooling. The operation of the peripheral device such as the linear scale 31, etc. can be thus normally kept stable.

As discussed above, according to the present invention, it is feasible to display, give the alarm about and prevent the variety of troubles caused by the heat emission of the DC linear motor. This enables an acquisition of the injection molding machine that is operable in safety and uses the DC linear motor including the temperature detection unit for detecting the temperature of the linear motor coil.

What is claimed is:

1. An injection molding machine using a linear motor, comprising:
    a linear motor serving as a linear drive mechanism;
    a temperature sensor configured to detect a temperature of a coil of said linear motor or an ambient temperature thereof and to output a temperature signal;
    an input unit configured to input the temperature signal output from said temperature sensor;
    a data converting unit configured to convert the temperature signal into temperature data;
    a storage unit, including a temperature data setting unit configured to preset an allowable range of temperature data configured to store temperature data converted by said data converting unit;
    a comparing/calculating unit configured to compare the temperature data converted by said data converting unit with the allowable range of temperature data set in said data setting unit and make a calculation based on the temperature data;
    an output unit configured to output an instruction signal and display data, corresponding to results of the comparison and calculation by said comparing/calculating unit; and a
    display unit configured to display the display data outputted from said comparing/calculating unit.

2. The injection molding machine using a linear motor according to claim 1, wherein said comparing/calculating unit calculates a continuous operable time until said temperature data reaches an upper limit of the allowable temperature is range, based on the temperature data by said data converting unit that is stored on said storage unit and on the allowable temperature range value set in said data setting unit of said storage unit.

3. The injection molding machine using a linear motor according to claim 1, wherein said comparing/calculating unit calculates an injection cycle time changing signal and cycle time data, from the temperature data provided by said data converting unit that is stored on said storage unit and from the allowable temperature value set in said data setting unit of said storage unit, and outputs the calculated results from said output unit.

4. The injection molding machine using a linear motor according to claim 1, wherein said output unit, when the temperature data that is stored in said storage unit exceeds the allowable temperature range value set in said data setting unit of said storage unit, outputs a motor stop signal.

5. The injection molding machine using a linear motor according to claim 1, further comprising a cooling device for forcibly cooling said linear motor, wherein said output unit, when the temperature data provided by said data converting unit that is stored on said storage unit exceeds a cooling necessary temperature value set in said data setting unit of said storage unit, outputs a forced cooling signal of said linear motor to said cooling device to cool said linear motor.

6. The injection molding machine using a linear motor according to claim 1, wherein said display unit, when value of the temperature data provided by said data converting unit that is stored on said storage unit exceeds an operation allowable temperature value of a linear motor peripheral device which is set in said data setting unit of said storage unit, displays an operation cautious alarm of the peripheral device on a display operation panel, and said output unit simultaneously outputs a forced cooling signal of said linear motor to said cooling device to cool said linear motor.

7. The injection molding machine using a linear motor according to claim 1, wherein said linear motor is a DC linear motor.

* * * * *